United States Patent
Li et al.

(10) Patent No.: US 12,344,532 B2
(45) Date of Patent: Jul. 1, 2025

(54) METHODS FOR PREPARING TWO-DIMENSIONAL SHEET-LIKE $Li_4SiO_4$ ADSORBENTS USING ATTAPULGITE AND WASTE LITHIUM BATTERIES

(71) Applicant: CHANGZHOU UNIVERSITY, Jiangsu (CN)

(72) Inventors: Xiazhang Li, Changzhou (CN); Taoli Huhe, Changzhou (CN); Shixiang Zuo, Changzhou (CN); Xiaofei Yin, Changzhou (CN); Xiaoshan Meng, Changzhou (CN); Chao Yao, Changzhou (CN); Bingying Gao, Changzhou (CN)

(73) Assignee: CHANGZHOU UNIVERSITY, Changzhou (CN)

( * ) Notice: Subject to any disclaimer, the term of this patent is extended or adjusted under 35 U.S.C. 154(b) by 0 days.

(21) Appl. No.: 18/952,072

(22) Filed: Nov. 19, 2024

(65) Prior Publication Data

US 2025/0074777 A1   Mar. 6, 2025

Related U.S. Application Data

(63) Continuation of application No. PCT/CN2024/090547, filed on Apr. 29, 2024.

(30) Foreign Application Priority Data

Jun. 9, 2023  (CN) .......................... 202310681390.2

(51) Int. Cl.
C01B 33/32   (2006.01)
C22B 1/02   (2006.01)
H01M 10/54   (2006.01)

(52) U.S. Cl.
CPC ................ *C01B 33/32* (2013.01); *C22B 1/02* (2013.01); *H01M 10/54* (2013.01);
(Continued)

(58) Field of Classification Search
None
See application file for complete search history.

(56) References Cited

U.S. PATENT DOCUMENTS

2022/0305475 A1   9/2022  Li et al.

FOREIGN PATENT DOCUMENTS

CN   101434393 A  *  5/2009
CN   102664293 A     9/2012
(Continued)

OTHER PUBLICATIONS

English translation of TW I555720 B (Year: 2016).*
(Continued)

*Primary Examiner* — Anthony J Zimmer
*Assistant Examiner* — Zachary John Baum
(74) *Attorney, Agent, or Firm* — Porus IP LLC

(57) ABSTRACT

A method for preparing two-dimensional sheet-like $Li_4SiO_4$ sorbent, including: obtaining $LiCoO_2$ by performing discharging, aluminum foil stripping, and sieving on waste lithium battery cathode material, and drying; obtaining biomass by freeze-drying waste biomass, and grinding and sieving the freeze-dried waste biomass; mixing $LiCoO_2$ and the biomass uniformly to obtain a mixture, and putting the mixture into a tube furnace for nitrogen purging, heating and calcination, and carbothermal reduction to obtain a solid sample, hydrothermal stirring the solid sample, followed by filtering, and evaporating to obtain $Li_2CO_3$; ultrasonically dispersing the attapulgite in an acid solution, and stirring in a water bath at 80° C. to obtain a first product, washing the first product until neutrality, filtering, and drying overnight
(Continued)

to obtain $SiO_2$; and ultrasonically dispersing the weighed $SiO_2$ in deionized water, adding NaOH for hydrothermal stirring, adding the obtained $Li_2CO_3$ for stirring reaction, adding $NH_4F$, and dropwise adding ammonia water to adjust pH of a solution, transferring the solution to a microwave hydrothermal reaction kettle for microwave hydrothermal reaction to obtain a second product, and centrifuging, washing, drying, and calcining the second product to obtain the two-dimensional sheet-like $Li_4SiO_4$.

9 Claims, 4 Drawing Sheets

(52) U.S. Cl.
CPC ...... *C01P 2002/01* (2013.01); *C01P 2002/72* (2013.01); *C01P 2002/82* (2013.01); *C01P 2004/04* (2013.01)

(56) References Cited

FOREIGN PATENT DOCUMENTS

| | | |
|---|---|---|
| CN | 102674383 A | 9/2012 |
| CN | 111430829 A | 7/2020 |
| CN | 113117637 A | 7/2021 |
| CN | 113479897 A | 10/2021 |
| CN | 113549765 A | 10/2021 |
| CN | 114368765 A | 4/2022 |
| CN | 115893511 A | 4/2023 |
| CN | 116688935 A | 9/2023 |
| KR | 20150127939 A | 11/2015 |
| TW | I555720 B * | 11/2016 |
| WO | 2013123746 A1 | 8/2013 |

OTHER PUBLICATIONS

English translation of CN-101434393-A Description (Year: 2009).*
English translation of CN-113117637-A Description (Year: 2021).*
Butler, S. Z., et al. Progress, challenges, and opportunities in two-dimensional materials beyond graphene. ACS Nano 7, 4, 2898-8926 (2013). (Year: 2013).*
English translation of CN 113479897 A. (Year: 2021).*
International Search Report in PCT/CN2024/090547 mailed on Jun. 20, 2024, 6 pages.
Written Opinion in PCT/CN2024/090547 mailed on Jun. 20, 2024, 9 pages.
First Office Action in Chinese Application No. 202310681390.2 mailed on Mar. 13, 2025, 20 pages.
Rajesh Belgamwar et al., Lithium silicate nanosheets with excellect capture capacity and kinetics with unprecedented stability for high-temperature CO2 capture, Chemical Science, 12: 4825-4835, 2021.

* cited by examiner

METHODS FOR PREPARING TWO-DIMENSIONAL SHEET-LIKE $Li_4SiO_4$ ADSORBENTS USING ATTAPULGITE AND WASTE LITHIUM BATTERIES

CROSS-REFERENCE TO RELATED APPLICATIONS

This application is a Continuation of International Application No. PCT/CN2024/090547, filed on Apr. 29, 2024, which claims priority to Chinese Patent Application No. 202310681390.2, filed on Jun. 9, 2023, the entire contents of each of which are hereby incorporated by reference.

TECHNICAL FIELD

The present disclosure relates to the technical field of resource utilization of waste lithium batteries and preparation of $CO_2$ adsorbents, and in particular, to a method for preparing a two-dimensional sheet-like $Li_4SiO_4$ adsorbent using attapulgite and a waste lithium battery.

BACKGROUND

Massive emissions of $CO_2$ are one of the main causes of global climate change, seriously threatening human survival. Countries around the world are developing corresponding technologies to address this challenge, among which carbon dioxide capture and storage (CCS) technology is considered one of the main measures to solve this crisis. In the different CCS technology fields, post-combustion capture (PCC) with regenerative solid adsorbents has been found to be suitable for carbon capture from high-temperature flue gas in large power plants. Among high-temperature $CO_2$ adsorbents such as CaO-based adsorbent, lithium-based ceramics, and clay minerals (e.g., hydrotalcite), $Li_4SiO_4$ is regarded as one of the most promising choices due to its moderate operating temperature and good cycling stability.

Attapulgite (ATP) is a natural clay mineral with abundant reserves, of which a crystal structure consists of a double-chain layer of Si—O tetrahedra, with the octahedral centers occupied by $Mg^{2+}$. Metal silicates with an octahedral structure possess the potential to be developed as silicate-based catalysts because transition metals may be doped into the silicates at the octahedral positions. In addition, lithium batteries, as energy storage units and the most common power supply units, are widely used in new energy vehicles, cell phones, computers, or the like, a large number of lithium batteries are discarded every year.

Currently, the improvement methods for preparing $Li_4SiO_4$ adsorbents mainly include improving the microstructure of the adsorbent, optimizing the adsorbent precursor, doping metal ions, and loading molten salts. However, it is a huge challenge for the development of CCS technology about how to construct adsorbents with high-efficiency and stable $CO_2$ adsorption capacity.

SUMMARY

One or more embodiments of the present disclosure provide a method for preparing two-dimensional sheet-like $Li_4SiO_4$ adsorbent using attapulgite and a waste lithium battery, comprising: (1) obtaining $LiCoO_2$ by performing discharging, aluminum foil stripping, and sieving on waste lithium battery cathode material containing $LiCoO_2$, and drying; obtaining biomass by freeze-drying waste biomass, and grinding and sieving the freeze-dried waste biomass; (2) taking the $LiCoO_2$ and the biomass obtained in step (1), mixing uniformly to obtain a mixture, and putting the mixture into a tube furnace for nitrogen purging, heating and calcination, and carbothermal reduction to obtain a solid sample, hydrothermal stirring the solid sample, followed by filtering, and evaporating to obtain $Li_2CO_3$ powder; (3) ultrasonically dispersing the attapulgite in an acid solution, and stirring in a water bath at 80° C. to obtain a first product, washing the first product until neutrality, filtering, and drying overnight to obtain $SiO_2$; and (4) weighing the $SiO_2$ obtained in step (3) and ultrasonically dispersing the weighed $SiO_2$ in deionized water, adding NaOH for hydrothermal stirring, adding the $Li_2CO_3$ obtained in step (2) for stirring reaction, adding $NH_4F$, and dropwise adding ammonia water to adjust pH of a solution, transferring the solution to a microwave hydrothermal reaction kettle for microwave hydrothermal reaction to obtain a second product, and centrifuging, washing, drying, and calcining the second product to obtain the two-dimensional sheet-like $Li_4SiO_4$.

One or more embodiments of the present disclosure provide a two-dimensional sheet-like $Li_4SiO_4$ adsorbent, which is prepared according to the above method.

BRIEF DESCRIPTION OF THE DRAWINGS

The present disclosure will be further illustrated by way of exemplary embodiments, which will be described in detail through the accompanying drawings. These embodiments are not limiting, and in these embodiments the same numbering indicates the same structure, wherein.

DETAILED DESCRIPTION

Figure 1:
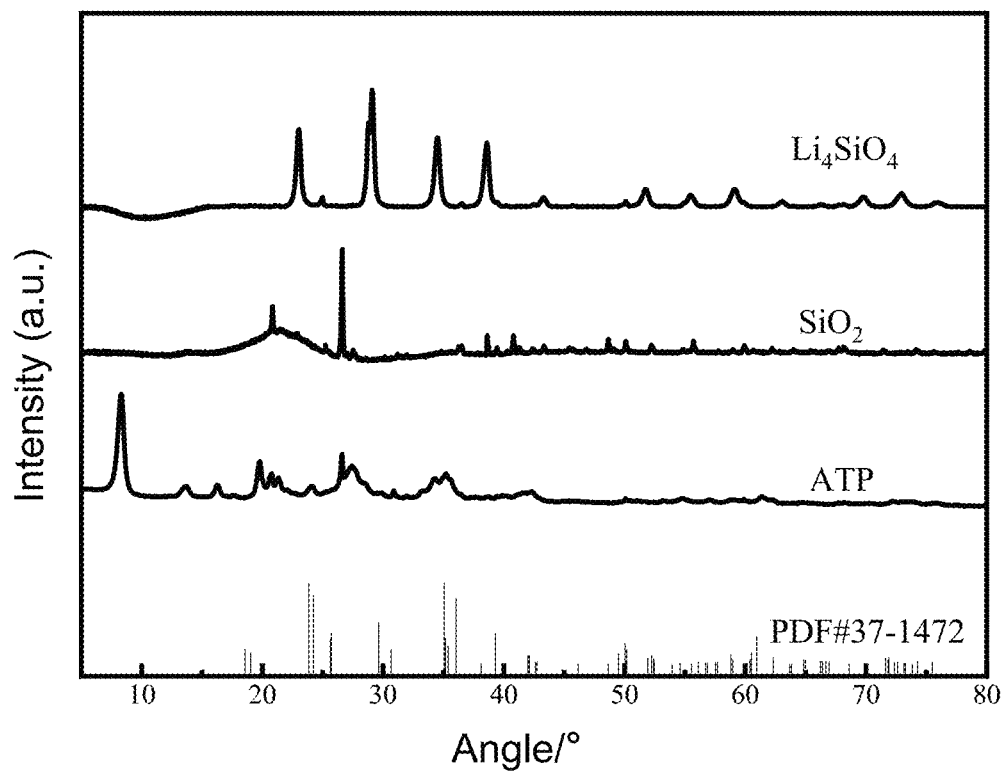
FIG. 1 is an X-ray diffraction (XRD) pattern of pristine attapulgite (ATP), $SiO_2$, and $Li_4SiO_4$ according to some embodiments of the present disclosure.

The technical schemes of embodiments of the present disclosure will be more clearly described below, and the accompanying drawings that need to be configured in the description of the embodiments will be briefly described below. Obviously, the drawings in the following description are merely some examples or embodiments of the present disclosure and will be applied to other similar scenarios according to these accompanying drawings without paying creative labor. Unless obviously obtained from the context or the context illustrates otherwise, the same numeral in the drawings refers to the same structure or operation.

As shown in the present disclosure and claims, unless the context clearly prompts the exception, "a," "one," and/or "the" are not specifically singular, and the plural may be included. It will be further understood that the terms "comprise," "comprises," and/or "comprising," "include," "includes," and/or "including," when used in present disclosure, specify the presence of stated features, integers, steps, operations, elements, and/or components, but do not preclude the presence or addition of one or more other features, integers, steps, operations, elements, components, and/or groups thereof.

One or more embodiments of the present disclosure provide a two-dimensional sheet-like $Li_4SiO_4$ adsorbent with high efficiency and stable $CO_2$ adsorption capacity, which has easily available raw materials and low cost. Its preparation method is simple and does not require complex and expensive equipment, which is conducive to large-scale promotion.

One of the embodiments of the present disclosure provides a method for preparing a two-dimensional sheet-like $Li_4SiO_4$ adsorbent by utilizing attapulgite and a waste lithium battery, comprising the following operations.

(1) Obtaining $LiCoO_2$ by performing discharging, aluminum foil stripping, and sieving on waste lithium battery cathode material (LCO, 98 wt %, 160 mesh) containing $LiCoO_2$, and drying; obtaining biomass by freeze-drying waste biomass, and grinding and sieving the freeze-dried waste biomass.

In some embodiments, in step (1), the waste lithium battery is one of lithium cobalt oxide, nickel cobalt manganese, or lithium iron phosphate, and a time of the drying is within a range of 4-8 h.

In some embodiments, in step (1), the waste biomass is one of onion, garlic, celery, lotus leaf, chestnut shell, pomegranate peel, or wheat straw, and a time of freeze-drying is within a range of 6-12 h.

(2) Taking the $LiCoO_2$ and the biomass obtained in step (1), mixing uniformly to obtain a mixture, and putting the mixture into a tube furnace for nitrogen purging, heating and calcination, and carbothermal reduction to obtain a solid sample, hydrothermal stirring the solid sample, followed by filtering, and evaporating to obtain $Li_2CO_3$ powder.

In some embodiments, in step (2), a mass ratio of the $LiCoO_2$ to the biomass is 1:(0.2-0.7).

In some embodiments, in step (2), a mass ratio of the $LiCoO_2$ and the waste biomass is 1:0.2, 1:0.5, and 1:0.7.

In some embodiments, in step (2), a time of the nitrogen purging is within a range of 10-20 min.

In some embodiments, in step (2), a time of the nitrogen purging is 10 min, 15 min, and 20 min.

In some embodiments, in step (2), a temperature of the heating and calcination is within a range of 400-500° C., a time of the heating and calcination is within a range of 20-40 min, and a heating rate of the heating and calcination is within a range of 2-15° C./min.

In some embodiments, in step (2), a temperature of the heating and calcination is 450° C., a time of the heating and calcination is 30 min, and a heating rate of the heating and calcination is 10° C./min. In some embodiments, in step (2), a temperature of the heating and calcination is 400° C., a time of the heating and calcination is 40 min, and a heating rate of the heating and calcination is 5° C./min. In some embodiments, in step (2), a temperature of the heating and calcination is 500° C., a time of the heating and calcination is 20 min, and a heating rate of the heating and calcination is 10° C./min.

In some embodiments, in step (2), a temperature of the hydrothermal stirring is within a range of 60-80° C. and a time of the hydrothermal stirring is within a range of 5-15 h.

In some embodiments, in step (2), a temperature of the hydrothermal stirring is 80° C. and a time of the hydrothermal stirring is 6 h.

(3) Ultrasonically dispersing the attapulgite in an acid solution and stirring in a water bath at 80° C. to obtain a first product, washing the first product until neutrality, filtering, and drying overnight to obtain $SiO_2$.

In some embodiments, the acid solution in step (3) is one of hydrochloric acid, nitric acid, or phosphoric acid.

(4) Weighing the $SiO_2$ obtained in step (3) and ultrasonically dispersing the weighed $SiO_2$ in deionized water, adding NaOH for hydrothermal stirring, adding the $Li_2CO_3$ obtained in step (2) for stirring reaction, adding $NH_4F$, and dropwise adding ammonia water to adjust pH of a solution, transferring the solution to a microwave hydrothermal reaction kettle for microwave hydrothermal reaction to obtain a second product, and centrifuging, washing, drying, and calcining the second product to obtain the two-dimensional sheet-like $Li_4SiO_4$.

In some embodiments, in step (4), a molar ratio of the $SiO_2$ to the NaOH is 1:(2-2.4), and a time of the hydrothermal stirring is within a range of 1-2 h.

In some embodiments, in step (4), a molar ratio of the $SiO_2$ to the NaOH is 1:2, and a time of the hydrothermal stirring is within a range of 1.5 h. In some embodiments, in step (4), a molar ratio of the $SiO_2$ to the NaOH is 1:2.4, and a time of the hydrothermal stirring is within a range of 1 h. In some embodiments, in step (4), a molar ratio of the $SiO_2$ to the NaOH is 1:2.4, and a time of the hydrothermal stirring is within a range of 2 h.

In some embodiments, in step (4), a molar ratio of the $SiO_2$ to the $Li_2CO_3$ is 1:(2.0-2.2), and a time of the stirring reaction is within a range of 0.5-1.5 h.

In some embodiments, in step (4), a molar ratio of the $SiO_2$ to the $Li_2CO_3$ is 1:2.1, and a time of the stirring reaction is within a range of 1 h. In some embodiments, in step (4), a molar ratio of the $SiO_2$ to the $Li_2CO_3$ is 1:2, and a time of the stirring reaction is within a range of 1.5 h. In some embodiments, in step (4), a molar ratio of the $SiO_2$ to the $Li_2CO_3$ is 1:2.2, and a time of the stirring reaction is within a range of 0.5 h.

In some embodiments, in step (4), a molar ratio of the $SiO_2$ to the $NH_4F$ is 1:(4-8), and the ammonia water is used to adjust the pH of the solution to be within a range of 9-13.

In some embodiments, in step (4), a molar ratio of the $SiO_2$ to the $NH_4F$ is 1:4.4 and the ammonia water is used to adjust the pH of the solution to 12. In some embodiments, in step (4), a molar ratio of the $SiO_2$ to the $NH_4F$ is 1:4, and the ammonia water is used to adjust the pH of the solution to 10. In some embodiments, in step (4), a molar ratio of the $SiO_2$ to the $NH_4F$ is 1:8, and the ammonia water is used to adjust the pH of the solution to 12.

In some embodiments, in step (4), a temperature of the microwave hydrothermal reaction is within a range of 140-180° C. and a time of the microwave hydrothermal reaction is within a range of 60-120 min.

In some embodiments, in step (4), a temperature of the microwave hydrothermal reaction is 160° C. and a time of the microwave hydrothermal reaction is 90 min. In some embodiments, in step (4), a temperature of the microwave hydrothermal reaction is 160° C. and a time of the microwave hydrothermal reaction is 120 min. In some embodiments, in step (4), a temperature of the microwave hydrothermal reaction is 180° C. and a time of the microwave hydrothermal reaction is 60 min.

In some embodiments, in step (4), a temperature of the calcining is within a range of 750-850° C. and a time of the calcining is 4 h.

In some embodiments, in step (4), a temperature of the calcining is 750° C., 800° C., and 850° C. and a time of the calcining is 4 h.

One or more embodiments of the present disclosure also provide an application of a two-dimensional sheet-like $Li_4SiO_4$ adsorbent prepared according to the method described above in $CO_2$ adsorption.

The $CO_2$ adsorption performance of the adsorbent is determined by a thermogravimetric analyzer. The method is as follows: 10 mg of the sample is placed into a crucible and heated to the adsorption temperature of 625° C. in 100 vol % nitrogen at a heating rate of 10° C.·min$^{-1}$ and the temperature is maintained for 120 min. At the same time, the gas is switched to 15 vol % $CO_2$ (nitrogen equilibrium) and the sample starts to absorb $CO_2$, where the gas flow rate of $CO_2$ or $N_2$ is 50 mL·min$^{-1}$ and the adsorption capacity of the adsorbent (Cn, g $CO_2$/g adsorbent) is defined according to the following equation (1):

$$Cn=(m_2-m_1)/m_1 \times 100\% \quad (1)$$

where $m_1$ and $m_2$ are the initial mass and maximum mass of the tested adsorbent during adsorption process, respectively.

The embodiments of the present disclosure have at least the following beneficial effects: carbothermal reduction of waste lithium batteries is performed utilizing waste biomass, and then one-dimensional rod-like clay minerals are converted into two-dimensional sheet-like silicates utilizing microwave hydrothermal method, i.e., using inexpensive precursors to synthesize an efficient two-dimensional sheet-like structure $Li_4SiO_4$ adsorbent, and at the same time, facilitating the recycling of waste lithium batteries and alleviating heavy metal pollution. In addition, during the reduction of waste lithium batteries using waste biomass before the carbothermal recovery of Li source, the residual N and F elements from waste biomass interfere with the adsorption and desorption process of $CO_2$ and lower the equilibrium temperature of adsorption and desorption process, and further improve the adsorption performance of the adsorbent $Li_4SiO_4$.

The experimental techniques in the following examples, unless otherwise specified, are conventional techniques. The test materials used in the following examples, unless otherwise specified, are obtained from standard biochemical reagent companies. Quantitative assays in the following examples are performed with three replicate experiments, and the results are averaged.

EXAMPLES

Example 1

(1) The waste lithium battery cathode material $LiCoO_2$ (LCO, 98 wt %, 160 mesh) was first subjected to pretreatment operations including discharging, aluminum foil stripping, and sieving, and drying for spare, and the fresh onion was freeze-dried, the freeze-dried onion was taken out, ground, and sieved to obtain Onion powder for spare.

(2) 3.00 g of LCO and 1.5 g of onion powder (a mass ratio 1:0.5) were fully and evenly mixed and dried in an oven at 100° C. for 2 h. Then the mixture was put into a tube furnace, nitrogen purging was first carried out for 15 min, then the mixture was heated up to 450° C. at a temperature increase rate of 10° C.·min$^{-1}$ and the temperature was maintained at 450° C. for 30 min, and a solid sample after carbothermal reduction treatment was obtained. The solid sample was then stirred hydrothermally at 80° C. for 6 h, and filtered, the filtrate was recovered, and $Li_2CO_3$ powder was obtained by evaporating the filtrate.

(3) 1 g of ATP was dissolved in 50 mL of hydrochloric acid solution at a concentration of 5 mol/L by ultrasonic dispersion and stirred in a water bath at 80° C. for 10 h to obtain a first product. The first product was then washed to neutrality, filtered, and then dried in an oven overnight. The content of metal ions in modified ATP is very low, and the main component of the modified ATP is $SiO_2$.

(4) In a beaker, 5 mmol of $SiO_2$ obtained from ATP acid treatment and 10 mmol of NaOH were added and stirred hydrothermally for 1.5 h. Then 10.5 mmol of $Li_2CO_3$ recovered from waste LCO was added, and after 1 h, 22 mmol of $NH_4F$ was added, and then ammonia water was added dropwise to adjust the pH of the solution to 12. Finally, the solution was then transferred into 100 mL of a microwave hydrothermal reaction kettle and subjected to a microwave hydrothermal treatment at 160° C. for 90 min. After the reaction, the sample was centrifuged, washed, dried overnight, and then calcined in a muffle furnace at 800° C. for 4 h to obtain $Li_4SiO_4$.

The $Li_4SiO_4$ adsorbent in Example 1 was tested using a thermogravimetric analyzer, including that: 10 mg of the sample was placed into a crucible and heated to 625° C. in 100 vol % nitrogen at a heating rate of 10° C.·min$^{-1}$ and the temperature was maintained at 625° C. for 120 min; at the same time, using 15 vol % $CO_2/N_2$ with a flow rate of 50 mL·min$^{-1}$ as simulated industrial flue gas, the adsorbent adsorbed $CO_2$ at 625° C. for 60 min. The adsorption capacity Cn of the adsorbent is 0.307 g/g.

The $Li_4SiO_4$ adsorbent prepared in Example 1 was subjected to X-ray powder diffraction experiments and Fourier transform infrared spectroscopy analysis experiments, and its morphology and structure were observed under transmission electron microscopy.

FIG. 1 is an XRD pattern of pristine ATP, $SiO_2$, and $Li_4SiO_4$ according to some embodiments of the present disclosure, wherein 8.5°, 20.1°, 28.0°, and 35.8° correspond to the characteristic peaks of ATP. Compared with pristine ATP, the characteristic peaks of acid-treated ATP do not contain the characteristic peaks of ATP, suggesting that most of the metal ions in ATP are solubilized, and the characteristic peaks of the acid-treated ATP correspond to the characteristic peaks of $SiO_2$. The characteristic peaks at 24.0°, 29.2°, 34.8°, 38.8°, 51.7°, 55.5°, and 60.1° correspond to the crystal planes (101), (020), (002), (102), (300), (013), and (231) of $Li_4SiO_4$ (PDF #37-1472), respectively, indicating that $Li_4SiO_4$ is successfully prepared by using Li source of waste LCO and Si source in ATP as precursors.

Figure 2:
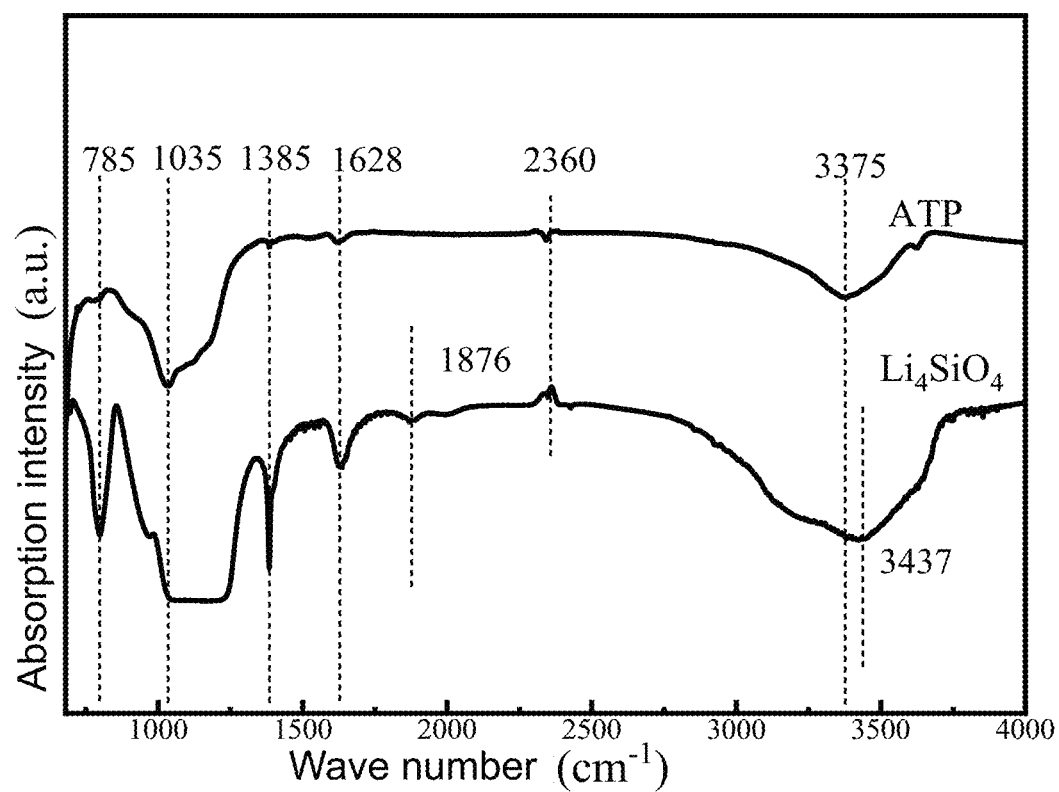
FIG. 2 is a Fourier Transform Infrared Spectroscopy (FT-IR) of pristine ATP and $Li_4SiO_4$ according to some embodiments of the present disclosure.

FIG. 2 is an FT-IR of pristine ATP and $Li_4SiO_4$ according to some embodiments of the present disclosure. For the pristine ATP, the characteristic peak at 3561 cm$^{-1}$ is the stretching vibration of the —OH structure, and the characteristic peaks at 1385 cm$^{-1}$ and 1628 cm$^{-1}$ are caused by the bending vibration of —OH of water adsorbed in the sample. The peak of $Li_4SiO_4$ is sharper than that of ATP, indicating that $Li_4SiO_4$ has more surface-active sites. A peak at 1035 cm$^{-1}$ is caused by the bending vibration of the Si—O—Si bond, proving that the Si—O tetrahedral structure of a-$Li_4SiO_4$ exists. The peak at 785 cm$^{-1}$ corresponds to the absorption vibration peak of Li—O—Li.

Figure 3A:
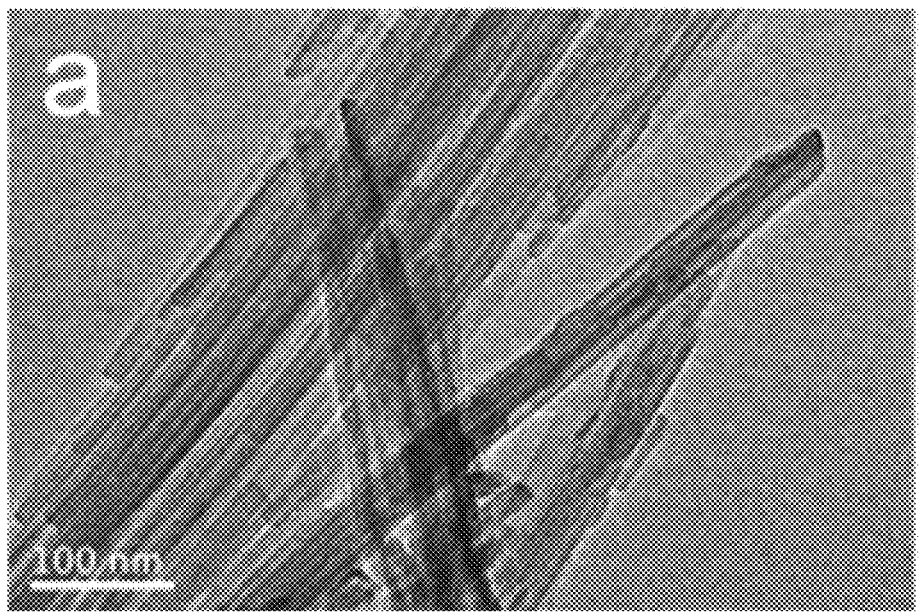
FIG. 3a and FIG. 3b are transmission electron microscopy (TEM) images of $SiO_2$ and $Li_4SiO_4$ according to some embodiments of the present disclosure.
Figure 3B:

FIG. 3a and FIG. 3b are TEM images of $SiO_2$ and $Li_4SiO_4$ according to some embodiments of the present disclosure. The microstructure of $SiO_2$ obtained from ATP acidification still maintains the one-dimensional nanofibrous rod structure of ATP, but there is a phenomenon of rod breakage and a tendency to sheet folding in some areas, as shown in FIG. 3a. As shown in FIG. 3b, the microstructures of $Li_4SiO_4$ and b-$Li_4SiO_4$ prepared using ATP as the silicon source are two-dimensional sheets, which is attributed to the fact that after the acid destroys the ATP framework, the silica-oxygen tetrahedral structure in the framework is preserved, and then under alkaline hydrothermal condition, the lithium can combine with the chain structure of the silicon-oxygen tetrahedron and grow directionally into two-dimensional $Li_4SiO_4$ sheets.

Example 2

(1) The waste lithium battery cathode material $LiCoO_2$ (LCO, 98 wt %, 160 mesh) was first subjected to pretreatment operations including discharging, aluminum foil stripping and sieving, and drying for spare, and the fresh onion was freeze-dried, taken out, ground, and sieved to obtain onion powder for spare.

(2) 3.00 g of LCO and 0.6 g of onion powder (mass ratio 1:0.2) were fully and evenly mixed and dried in an oven at 100° C. for 2 h. Then the mixture was put into a tube furnace, nitrogen purging was first carried out for 20 min, then the mixture was heated to 400° C. at a temperature increase rate of 5° C.·$min^{-1}$ and the temperature was maintained at 400° C. for 40 min, and a solid sample after carbothermal reduction treatment was obtained. The solid sample was then stirred hydrothermally at 80° C. for 6 h, and filtered, the filtrate was recovered, and $Li_2CO_3$ powder was obtained by evaporating the filtrate.

(3) Modification of ATP was consistent with step (3) of Example 1.

(4) Microwave hydrothermal preparation of $Li_4SiO_4$ was consistent with step (4) of Example 1, but the pH needed to be adjusted to 13.

The $Li_4SiO_4$ adsorbent in Example 2 was tested using a thermogravimetric analyzer, including that 10 mg of the sample was placed into a crucible and heated to 625° C. in 100 vol % nitrogen at a heating rate of 10° C.·$min^{-1}$ and the temperature was maintained at 625° C. for 120 min; at the same time, using 15 vol % $CO_2/N_2$ with a flow rate of 50 mL·$min^{-1}$ as simulated industrial flue gas, the adsorbent adsorbed $CO_2$ at 625° C. for 60 min. The adsorption capacity Cn of the adsorbent is 0.285 g/g.

Example 3

(1) The waste lithium battery cathode material $LiCoO_2$ (LCO, 98 wt %, 160 mesh) was first subjected to pretreatment operations such as discharging, aluminum foil stripping and sieving, and drying for spare, and the fresh onion was freeze-dried, taken out, ground, and sieved to obtain onion powder for spare.

(2) 3.00 g of LCO and 2.1 g of onion powder (mass ratio 1:0.7) were fully and evenly mixed and dried in an oven at 100° C. for 2 h. Then the mixture was put into a tube furnace, nitrogen purging was first carried out for 10 min, then the mixture was heated to 500° C. at a temperature increase rate of 10° C.·$min^{-1}$ and the temperature was maintained at 500° C. for 20 min, and a solid sample after carbothermal reduction treatment was obtained. The solid sample was then stirred hydrothermally at 80° C. for 6 h, and filtered, the filtrate was recovered, and $Li_2CO_3$ powder was obtained by evaporating the filtrate.

(3) Modification of ATP was consistent with step (3) of Example 1.

(4) Microwave hydrothermal preparation of $Li_4SiO_4$ was consistent with step (4) of Example 1, but the pH needs to be adjusted to 9.

The $Li_4SiO_4$ adsorbent in Example 3 was tested using a thermogravimetric analyzer, including that 10 mg of the sample was placed into a crucible and heated to 625° C. in 100 vol % nitrogen at a heating rate of 10° C.·$min^{-1}$ and the temperature was maintained at 625° C. for 120 min; at the same time, using 15 vol % $CO_2/N_2$ with a flow rate of 50 mL·$min^{-1}$ as simulated industrial flue ga, the adsorbent adsorbed $CO_2$ at 625° C. for 60 min. The adsorption capacity Cn of the adsorbent is 0.298 g/g.

Example 4

(1) The treatment of waste lithium batteries and waste biomass was consistent with step (1) of Example 1.

(2) Carbothermal reduction of waste lithium battery cathode material was consistent with step (2) of Example 1.

(3) Modification of ATP was consistent with step (3) of Example 1.

(4) In a beaker, 5 mmol of $SiO_2$ obtained from ATP acid treatment and 12 mmol of NaOH were added and stirred hydrothermally for 1 h. Then 10 mmol of $Li_2CO_3$ recovered from waste LCO was added, and after 1.5 h, 20 mmol of $NH_4F$ was added, and then ammonia water was added dropwise to adjust the pH of the solution to 10. Finally, the solution was then transferred into 100 mL of a microwave hydrothermal reaction kettle and subjected to a microwave hydrothermal treatment at 160° C. for 120 min. After the reaction, a sample was centrifuged, washed, dried overnight, and then calcined in a muffle furnace at 750° C. for 4 h to obtain $Li_4SiO_4$.

The $Li_4SiO_4$ adsorbent in Example 4 was tested using a thermogravimetric analyzer, including that 10 mg of the sample was placed into a crucible and heated to 625° C. in 100 vol % nitrogen at a heating rate of 10° C.·$min^{-1}$ and the temperature was maintained at 625° C. for 120 min; at the same time, using 15 vol % $CO_2/N_2$ with a flow rate of 50 mL·$min^{-1}$ as simulated industrial flue gas, the adsorbent adsorbed $CO_2$ at 625° C. for 60 min. The adsorption capacity Cn of the adsorbent is 0.283 g/g.

Example 5

(1) The treatment of waste lithium batteries and waste biomass was consistent with step (1) of Example 1.

(2) Carbothermal reduction of waste lithium battery cathode material was consistent with step (2) of Example 1.

(3) Modification of ATP was consistent with step (3) of Example 1.

(4) In a beaker, 5 mmol of $SiO_2$ obtained from ATP acid treatment and 12 mmol of NaOH were added and stirred hydrothermally for 2 h. Then 11 mmol of $Li_2CO_3$ recovered from waste LCO was added, and after 0.5 h, 40 mmol of $NH_4F$ was added, and then ammonia water was added dropwise to adjust the pH of the solution to 12. Finally, the solution was then transferred into 100 ml of a microwave hydrothermal reaction kettle and subjected to hydrothermal treatment at 180° C. for 60 min. After the reaction, the sample was centrifuged, washed, dried overnight, and then calcined in a muffle furnace at 850° C. for 4 h to obtain $Li_4SiO_4$.

The $Li_4SiO_4$ adsorbent in Example 5 was tested using a thermogravimetric analyzer, including that 10 mg of the sample was placed into a crucible and heated to 625° C. in 100 vol % nitrogen at a heating rate of 10° C.·$min^{-1}$ and the temperature was maintained at 625° C. for 120 min; at the same time, using 15 vol % $CO_2/N_2$ with a flow rate of 50 mL·$min^{-1}$ as simulated industrial flue gas, the adsorbent adsorbed $CO_2$ at 625° C. for 60 min. The adsorption capacity Cn of the adsorbent is 0.301 g/g.

It can be seen from Examples 1, 2, and 3 that the mass ratio of waste lithium battery cathode material to biomass and the carbothermal reduction temperature are the key influencing factors for the recovery of lithium sources, thus the $CO_2$ adsorption performance of the prepared $Li_4SiO_4$ is slightly different. When the carbothermal reduction temperature is too low (below 400° C.), the carbothermal reduction reaction is not complete and the yield of $Li_2CO_3$ is lower than that of $Li_2CO_3$ obtained at 450° C. in Example 1. When the temperature is too high (above 500° C.), onion powder is easily converted into biochar, which may lead to the transfer of gas-solid reaction to solid-solid carbothermal reduction. Solid carbothermal reduction may reduce $Co^{3+}$ in LCO to metallic Co, CoO, and $Co_3O_4$, resulting in a decrease in the recovery efficiency of lithium source. In addition, a high temperature not only increases energy consumption, but also leads to possible loss of Li and secondary pollution.

It can be seen from Examples 1, 4, and 5 that in the step of preparing $Li_4SiO_4$, after the ATP was treated with a high concentration of acid, the rod-like structure of ATP is damaged, fractured, and tended to be assembled into sheets with each other. The formation of the sheet-like structure of $Li_4SiO_4$ may be caused by the retention of the silicon-oxygen tetrahedral structure in the framework after the ATP structure is destroyed, after adding $Li^+$, under alkaline hydrothermal condition, the chain structure of the silicon-oxygen tetrahedron regularly growing into $Li_4SiO_4$ nanosheets. It is worth noting that $Li_2CO_3$ needs to be added in excess because Li is prone to volatilization under the hydrothermal reaction condition.

Comparative Example 1

The steps of Comparative Example 1 were consistent with Example 1, except that the lithium source recovered from the waste lithium battery cathode material in step (4) was replaced with analytical grade lithium carbonate.

The $Li_4SiO_4$ adsorbent in Comparative Example 1 was tested using a thermogravimetric analyzer, including that 10 mg of the sample was placed into a crucible and heated to 625° C. in 100 vol % nitrogen at a heating rate of 10° C.·$min^{-1}$ and the temperature was maintained at 625° C. for 120 min; at the same time, using 15 vol % $CO_2/N_2$ with a flow rate of 50 mL·$min^{-1}$ as simulated industrial flue gas, the adsorbent adsorbed $CO_2$ at 625° C. for 60 min. The adsorption capacity Cn of the adsorbent is 0.266 g/g.

Figure 4:
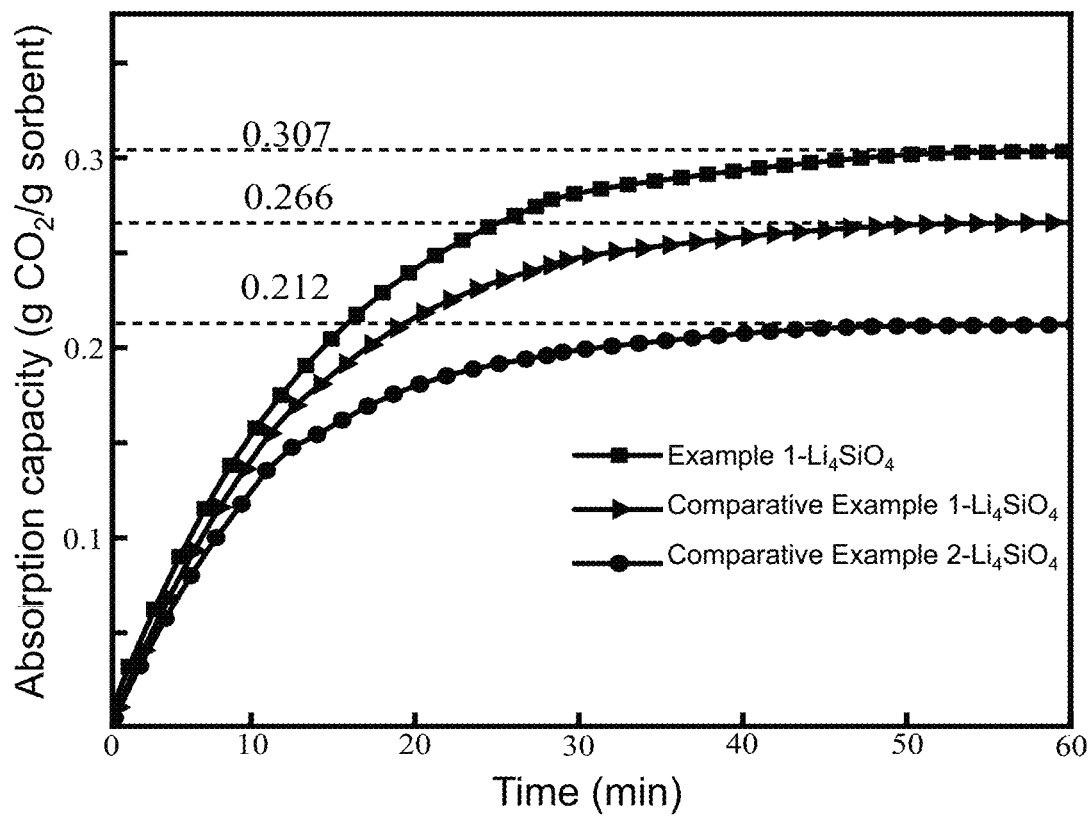
FIG. 4 is a diagram illustrating the $CO_2$ adsorption properties of $Li_4SiO_4$ prepared according to some embodiments of the present disclosure.

Compared with Example 1, the adsorption capacity of the adsorbent in Comparative Example 1 is much lower than that in Example 1, as shown in FIG. 4. The reason may be that the lithium source recovered from waste lithium batteries by carbothermal reduction of onion powder contains a small amount of elements such as N and F, these elements can promote the adsorption of $CO_2$, and the cost is much lower than that of analytical grade lithium carbonate. In addition, the residual trace amount of biochar in the carbothermal reduction process can play a supporting role for the two-dimensional nanosheets and improve the stability of sheet-like $Li_4SiO_4$, thus, the $Li_4SiO_4$ prepared in Example 1 has better adsorption stability.

Comparative Example 2

The steps of Comparative Example 2 were consistent with Example 1, except that the silicon source obtained from the modified attapulgite in step (3) is replaced with analytical grade silica sol.

The $Li_4SiO_4$ adsorbent in Comparative Example 2 was tested using a thermogravimetric analyzer, including that 10 mg of the sample was placed into a crucible and heated to 625° C. in 100 vol % nitrogen at a heating rate of 10° C.·$min^{-1}$ and the temperature was maintained at 625° C. for 120 min; at the same time, using 15 vol % $CO_2/N_2$ with a flow rate of 50 mL·$min^{-1}$ as simulated industrial flue gas, the adsorbent adsorbed $CO_2$ at 625° C. for 60 min. The adsorption capacity Cn of the adsorbent is 0.212 g/g.

Compared with Example 1, the adsorption capacity of the adsorbent in Comparative Example 2 is much lower than that in Example 1, as shown in FIG. 4. The reason may be that the morphology of $Li_4SiO_4$ prepared using $SiO_2$ sol is agglomerated spherical particles, whereas the microstructure of $Li_4SiO_4$ prepared using ATP as a silica source is two-dimensional sheets, which is attributed to the structural specificity of an attapulgite, and the sheet structure of the attapulgite has a higher porosity and larger specific surface area for adsorption, thus the $Li_4SiO_4$ prepared in Example 1 has stronger adsorption properties.

Comparative Example 3

The steps of Comparative Example 2 were consistent with Example 1, except that in step (4), $NH_4F$ was not added and $NH_3 \cdot H_2O$ was only added to adjust the pH to 12.

The $Li_4SiO_4$ adsorbent in Comparative Example 3 was tested using a thermogravimetric analyzer, including that 10 mg of the sample was placed into a crucible and heated to 625° C. in 100 vol % nitrogen at a heating rate of 10° C.·$min^{-1}$ and the temperature was maintained at 625° C. for 120 min; at the same time, using 15 vol % $CO_2/N_2$ with a flow rate of 50 mL·$min^{-1}$ as simulated industrial flue gas, the adsorbent adsorbed $CO_2$ at 625° C. for 60 min. The adsorption capacity Cn of the adsorbent is 0.207 g/g.

Compared with Example 1, the adsorption capacity of the adsorbent in Comparative Example 3 is much lower than that in Example 1, which may be due to not adding $NH_4F$, causing that $Li_4SiO_4$ agglomerates to fail to grow into a lamellar structure.

The basic concepts have been described above, apparently, in detail, as will be described above, and do not constitute limitations of the disclosure. Although there is no clear explanation here, those skilled in the art may make various modifications, improvements, and modifications of the present disclosure. This type of modification, improvement, and corrections are recommended in the present disclosure, so the modification, improvement, and amendment remain in the spirit and scope of the exemplary embodiment of the present disclosure.

At the same time, the present disclosure uses specific words to describe the embodiments of the present disclosure. As "one embodiment," "an embodiment," and/or "some embodiments" means a certain feature, structure, or characteristic of at least one embodiment of the present disclosure. Therefore, it is emphasized and should be appreciated that two or more references to "an embodiment", "one embodiment", or "an alternative embodiment" in various parts of the present disclosure are not necessarily all referring to the same embodiment. Further, certain features, structures, or features of one or more embodiments of the present disclosure may be combined.

In addition, unless clearly stated in the claims, the order of processing elements and sequences, the use of numbers and letters, or the use of other names in the present disclosure are not used to limit the order of the procedures and methods of the present disclosure. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially." Unless otherwise stated, "about," "approximate," or "substantially" may indicate ±20% variation of the value it describes. Accordingly, in some embodiments, the numerical parameters used in the specification and claims are approximate values, and the approximation may change according to the characteristics required by the individual embodiments. In some embodiments, the numerical parameter should consider the prescribed effective digits and adopt a general digit retention method. Although in some embodiments, the numerical fields and parameters used to confirm the breadth of its range are approximate values, in specific embodiments, such numerical values are set as accurately as possible within the feasible range.

With respect to each patent, patent application, patent application disclosure, and other material cited in the present disclosure, such as articles, books, manuals, publications, documents, etc., the entire contents thereof are hereby incorporated by reference into the present disclosure. Application history documents that are inconsistent with the contents of the present disclosure or that create conflicts are excluded, as are documents (currently or hereafter appended to the present disclosure) that limit the broadest scope of the claims of the present disclosure. It should be noted that in the event of any inconsistency or conflict between the descriptions, definitions, and/or use of terms in the materials appended to the present disclosure and those described in the present disclosure, the descriptions, definitions, and/or use of terms in the present disclosure shall prevail.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for preparing a two-dimensional sheet-like $Li_4SiO_4$ sorbent using attapulgite and a waste lithium battery, comprising:

(1) obtaining $LiCoO_2$ by performing discharging, aluminum foil stripping, and sieving on waste lithium battery cathode material containing $LiCoO_2$, and drying; obtaining biomass by freeze-drying waste biomass, and grinding and sieving the freeze-dried waste biomass;

(2) taking the $LiCoO_2$ and the biomass obtained in step (1), mixing uniformly to obtain a mixture, and putting the mixture into a tube furnace for nitrogen purging, heating and calcination, and carbothermal reduction to obtain a solid sample, hydrothermal stirring the solid sample, followed by filtering, and evaporating to obtain $Li_2CO_3$ powder;

(3) ultrasonically dispersing the attapulgite in a first solution that is acidic, and stirring in a water bath at 80° C. to obtain a first product, washing the first product until neutrality, filtering, and drying overnight to obtain $SiO_2$; and (4) weighing the $SiO_2$ obtained in step (3) and ultrasonically dispersing the weighed $SiO_2$ in deionized water, adding NaOH for hydrothermal stirring, adding the $Li_2CO_3$ obtained in step (2) for stirring reaction, followed by adding $NH_4F$ to obtain a second solution, and dropwise adding ammonia water to adjust pH of the second solution, transferring the second solution to a microwave hydrothermal reaction kettle for microwave hydrothermal reaction to obtain a second product, and centrifuging, washing, drying, and calcining the second product to obtain the two-dimensional sheet-like $Li_4SiO_4$.

2. The method of claim 1, wherein in step (1), the waste lithium battery is one of lithium cobalt oxide, nickel cobalt manganese, or lithium iron phosphate, and a time of the drying is within a range of 4-8 h; and the waste biomass is one of onion, garlic, celery, lotus leaf, chestnut shell, pomegranate peel, or wheat straw, and a time of the freeze-drying is within a range of 6-12 h.

3. The method of claim 1, wherein in step (2), a mass ratio of the $LiCoO_2$ to the biomass is 1:(0.2-0.7);
a time of the nitrogen purging is within a range of 10-20 min;
a temperature of the heating and calcination is within a range of 400-500° C., a time of the heating and calcination is within a range of 20-40 min, and a heating rate of the heating and calcination is within a range of 2-15° C./min.

4. The method of claim 1, wherein in step (2), a temperature of the hydrothermal stirring is within a range of 60-80° C. and a time of the hydrothermal stirring is within a range of 5-15 h.

5. The method of claim 1, wherein in step (3), the first solution contains one of hydrochloric acid, nitric acid, or phosphoric acid.

6. The method of claim 1, wherein in step (4), a molar ratio of the $SiO_2$ to the NaOH is 1:(2-2.4), and a time of the hydrothermal stirring is within a range of 1-2 h.

7. The method of claim 1, wherein in step (4), a molar ratio of the $SiO_2$ to the $Li_2CO_3$ is 1:(2.0-2.2), and a time of the stirring reaction is within a range of 0.5-1.5 h.

8. The method of claim 1, wherein in step (4), a molar ratio of the $SiO_2$ to the $NH_4F$ is 1:(4-8), and the ammonia water is used to adjust the pH of the second solution to be within a range of 9-13.

9. The method of claim 1, wherein in step (4), a temperature of the microwave hydrothermal reaction is within a range of 140-180° C. and a time of the microwave hydrothermal reaction is within a range of 60-120 min; and a temperature of the calcination is within a range of 750-850° C. and a time of the calcination is 4 h.

* * * * *